(12) United States Patent
Harada et al.

(10) Patent No.: US 12,172,645 B2
(45) Date of Patent: Dec. 24, 2024

(54) VEHICLE CONTROL DEVICE FOR CONTROLLING LANE CHANGE OPERATION, MEDIUM FOR STORING COMPUTER PROGRAM FOR CONTROLLING VEHICLE LANE CHANGE OPERATION, AND METHOD FOR CONTROLLING VEHICLE LANE CHANGE OPERATION

(71) Applicant: TOYOTA JIDOSHA KABUSHIKI KAISHA, Toyota (JP)

(72) Inventors: Kota Harada, Tokyo-to (JP); Ryuta Hashimoto, Tokyo-to (JP); Takahiro Seta, Yokohama (JP); Takahiro Kawano, Tokyo-to (JP); Yuki Mori, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 296 days.

(21) Appl. No.: 17/656,369

(22) Filed: Mar. 24, 2022

(65) Prior Publication Data
US 2022/0306115 A1  Sep. 29, 2022

(30) Foreign Application Priority Data

Mar. 24, 2021  (JP) .................. 2021-049726

(51) Int. Cl.
B60W 30/18    (2012.01)
B60W 40/04    (2006.01)
(Continued)

(52) U.S. Cl.
CPC ...... *B60W 30/18163* (2013.01); *B60W 40/04* (2013.01); *B60W 60/0011* (2020.02);
(Continued)

(58) Field of Classification Search
CPC .......... B60W 30/18163; B60W 40/04; B60W 60/0011; B60W 60/0013; B60W 60/0053;
(Continued)

(56) References Cited

U.S. PATENT DOCUMENTS

2017/0225685 A1* 8/2017 Aoki ...................... B60Q 1/346
2019/0039618 A1   2/2019 Mori
(Continued)

FOREIGN PATENT DOCUMENTS

JP  2017-159885 A   9/2017
JP  2019-109666 A   7/2019
WO  2017175377 A1  10/2017

*Primary Examiner* — James J Lee
*Assistant Examiner* — Alexander George Matta
(74) *Attorney, Agent, or Firm* — Dickinson Wright, PLLC (57) ABSTRACT

A vehicle control device has a processor configured to generate a first traveling lane plan representing the traveling lane in which the vehicle is traveling within a first driving zone of a navigation route, to generate a first lane change plan representing movement of the vehicle between lanes, based on the first traveling lane plan or on surrounding environment information and, when the first lane change plan has been generated, to determine whether or not there exists a control transfer request zone at less than a first reference distance from the location of the vehicle on the post-movement traffic lane, or a lane change schedule zone at less than a second reference distance, and the first lane change plan is cancelled when such a control transfer request zone or lane change schedule zone exists.

6 Claims, 9 Drawing Sheets

(51) Int. Cl.
  *B60W 60/00* (2020.01)
  *G06V 20/56* (2022.01)
(52) U.S. Cl.
  CPC .... *B60W 60/0013* (2020.02); *B60W 60/0053* (2020.02); *G06V 20/588* (2022.01); *B60W 2420/403* (2013.01); *B60W 2556/40* (2020.02)
(58) Field of Classification Search
  CPC ....... B60W 2420/403; B60W 2556/40; B60W 2552/53; B60W 60/001; B60W 40/02; B60W 50/082; B60W 60/0015; G06V 20/588
  See application file for complete search history.

(56) References Cited

U.S. PATENT DOCUMENTS

| | | | |
|---|---|---|---|
| 2019/0113914 A1 | 4/2019 | Abe et al. | |
| 2020/0207354 A1* | 7/2020 | Ishioka | B60W 10/20 |
| 2020/0307594 A1* | 10/2020 | Kato | B60W 50/14 |
| 2021/0107472 A1* | 4/2021 | Rachor | B60Q 9/008 |
| 2022/0083065 A1* | 3/2022 | Liu | G01C 21/26 |

* cited by examiner

VEHICLE CONTROL DEVICE FOR CONTROLLING LANE CHANGE OPERATION, MEDIUM FOR STORING COMPUTER PROGRAM FOR CONTROLLING VEHICLE LANE CHANGE OPERATION, AND METHOD FOR CONTROLLING VEHICLE LANE CHANGE OPERATION

FIELD

The present disclosure relates to a vehicle control device, to a medium that stores a computer program for vehicle control, and to a method for controlling a vehicle.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route. The automatic control system also controls operation of the vehicle, including its movement between traffic lanes.

When it has determined that driving of the vehicle by automatic control is difficult, the automatic control system notifies the driver of a control transfer request to transfer control of vehicle driving from automatic control to manual control. After the driver that has received the notification has performed the operation to acknowledge the control transfer request, manual control of the vehicle is initiated (see Japanese Unexamined Patent Publication No. 2017-159885, for example).

SUMMARY

Depending on the terrain on which the vehicle is traveling, after having moved between traffic lanes onto a traffic lane, there may exist a control transfer request zone in which the driver is to be given a request for control transfer, to transfer driving of the vehicle from automatic control to manual control. If the location of the control transfer request zone is just ahead on the post-movement traffic lane, the automatic control system notifies the driver of the control transfer request immediately after the vehicle has moved onto the traffic lane.

However, when notification of a control transfer request is given immediately after the vehicle has moved onto the traffic lane, the driver may become confused and uncomfortable with driving the vehicle by automatic control.

It is an object of the present disclosure to provide a vehicle control device that prevents the driver from being excessively notified by a control transfer request, allowing the driver to feel more comfortable with driving of the vehicle by automatic control.

One embodiment of the invention provides a vehicle control device. The vehicle control device has a traveling lane planning unit that generates a first traveling lane plan representing the traveling lane in which the vehicle is traveling within a first driving zone of a navigation route, based on the current location of the vehicle, map information and the navigation route, a lane change planning unit that generates a first lane change plan representing movement of the vehicle between lanes, based on the first traveling lane plan or on surrounding environment information, and a zone assessment unit that, determines whether or not there exists a control transfer request zone where the driver is to be given a request to transfer driving of the vehicle from automatic control to manual control at less than a first reference distance from the location of the vehicle on the post-movement traffic lane, or a lane change schedule zone where it is planned to move from the post-movement traffic lane back to the pre-movement traffic lane at less than a second reference distance, when the first lane change plan has been generated, wherein the lane change planning unit cancels the first lane change plan when the control transfer request zone or the lane change schedule zone exists.

Preferably, the vehicle control device has a location estimating unit that estimates the location of the vehicle on the post-movement traffic lane, the traveling lane planning unit generates a second traveling lane plan representing the traveling lane in which the vehicle is traveling in a second driving zone of the navigation route, based on the location of the vehicle on the post-movement traffic lane, the map information and the navigation route, and the lane change planning unit generates a second lane change plan representing movement of the vehicle between lanes, based on the second traveling lane plan.

Also preferably, the lane change planning unit of the vehicle control device sets the lane change schedule zone to be an automatic lane change schedule zone in which movement of the vehicle between lanes by automatic control is planned or a manual lane change schedule zone in which movement of the vehicle between lanes by manual control is planned, based on the second traveling lane plan.

Also preferably, the lane change planning unit of the vehicle control device generates the first lane change plan based on the first traveling lane plan, surrounding environment information or a request for movement between lanes by the driver, and when the first lane change plan has been generated, the zone assessment unit determines whether or not a control transfer request zone or lane change schedule zone exists.

According to another embodiment, a computer-readable, non-transitory medium storing a computer program for vehicle control is provided. The computer program causes a processor to execute a process, and the process has generating a first traveling lane plan representing the traveling lane in which the vehicle is traveling within a first driving zone of a navigation route, based on the current location of the vehicle, map information and the navigation route, generating a first lane change plan representing movement of the vehicle between lanes, based on the first traveling lane plan or on surrounding environment information, and determining whether or not there exists a control transfer request zone where the driver is to be given a request to transfer driving of the vehicle from automatic control to manual control at less than a first reference distance from the location of the vehicle on the post-movement traffic lane, or a lane change schedule zone where it is planned to move from the post-movement traffic lane back to the pre-movement traffic lane at less than a second reference distance, when the first lane change plan has been generated, wherein the first lane change plan is cancelled when the control transfer request zone or the lane change schedule zone exists.

Another embodiment of the invention provides a method for controlling a vehicle carried out by a vehicle control device. The method for controlling a vehicle has generating a first traveling lane plan representing the traveling lane in which the vehicle is traveling within a first driving zone of a navigation route, based on the current location of the vehicle, map information and the navigation route, generating a first lane change plan representing movement of the vehicle between lanes, based on the first traveling lane plan or on surrounding environment information, and determining whether or not there exists a control transfer request zone where the driver is to be given a request to transfer driving of the vehicle from automatic control to manual control at less than a first reference distance from the location of the vehicle on the post-movement traffic lane, or a lane change schedule zone where it is planned to move from the post-movement traffic lane back to the pre-movement traffic lane at less than a second reference distance, when the first lane change plan has been generated, wherein the first lane change plan is cancelled when the control transfer request zone or the lane change schedule zone exists.

The vehicle control device of the present disclosure prevents the driver from being excessively notified by a control transfer request, allowing the driver to feel more comfortable with operation of the vehicle by automatic control.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
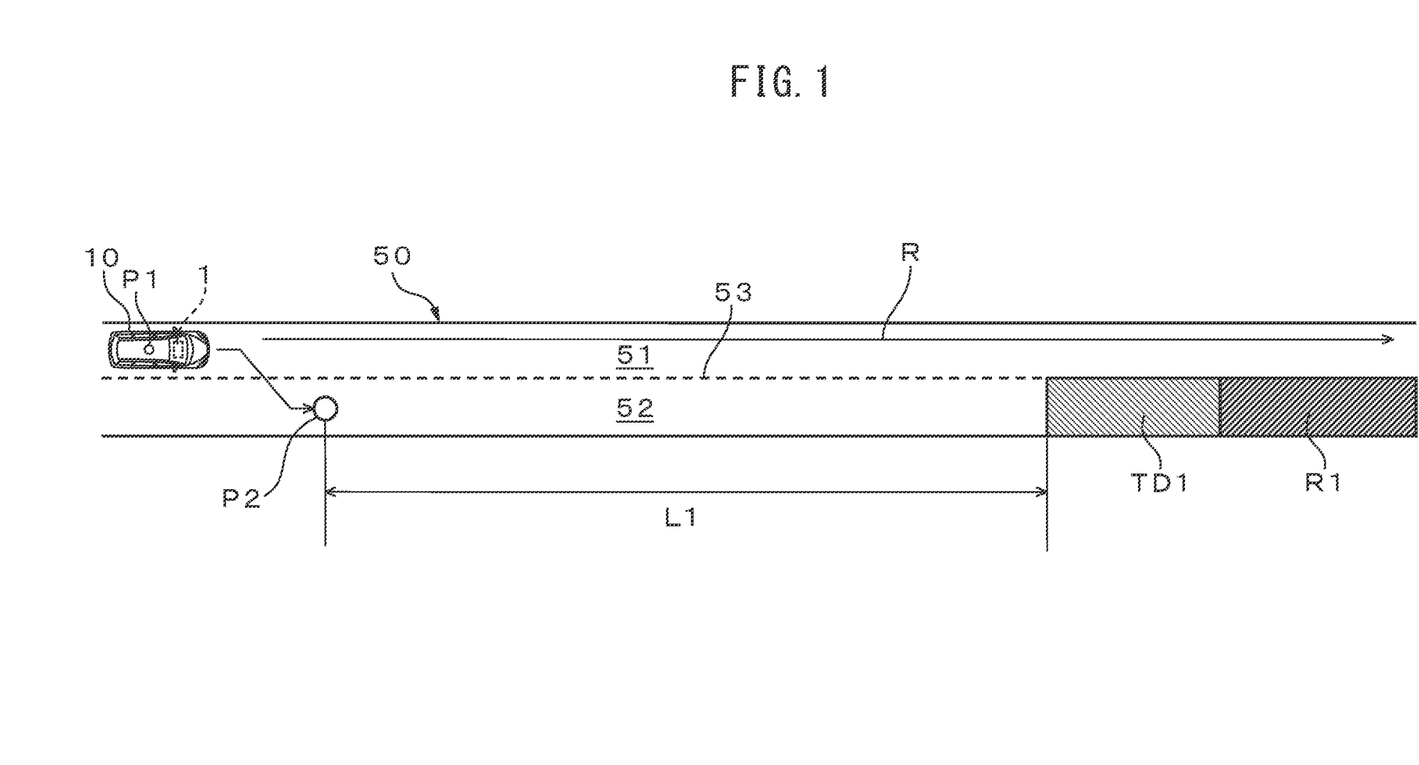
FIG. 1 is a diagram illustrating in overview the operation of a vehicle control system according to a first embodiment.

FIG. 1 is a diagram illustrating in overview the operation of a vehicle control system 1 according to the first embodiment. Operation relating to vehicle control processing by the vehicle control system 1 disclosed herein will now be described in overview with reference to FIG. 1.

The vehicle 10 is traveling on one traffic lane 51 of a road 50 having traffic lanes 51, 52. The traffic lane 51 and traffic lane 52 are divided by a lane marking line 53. A navigation route R generated by the vehicle control system 1 represents progress along the road 50.

Based on the current location of the vehicle P1, map information and the navigation route R, the vehicle control system 1 generates a traveling lane plan representing the traveling lane in which the vehicle 10 is traveling within the nearest driving zone of the navigation route R.

The vehicle control system 1 generates a lane change plan for movement from the traffic lane 51 to the traffic lane 52, based on the traveling lane plan, surrounding environment information or a request for movement between lanes by the driver, and estimates a location P2 of the vehicle 10 on the post-movement traffic lane 52. The surrounding environment information includes, for example, information regarding other vehicles traveling in front of the vehicle 10.

A control transfer request zone TD1 exists, where the driver is to be requested to transfer operation of the vehicle 10 from automatic control to manual control, at a location at distance L1 from the location P2 of the vehicle 10 on the post-movement traffic lane 52 in the traveling direction. The control transfer request zone TD1 is set before an automatic control prohibited region R1 where the vehicle control system 1 does not allow operation of the vehicle 10 by automatic control.

In the example shown in FIG. 1, the distance L1 between the location P2 of the vehicle 10 on the post-movement traffic lane 52 and the control transfer request zone TD1 is a distance less than a first reference distance. The first reference distance is a distance such that any distance greater than the distance allows the driver to have ample time to acknowledge the control transfer request and begin manual control of the vehicle 10 even if the driver is notified of the control transfer request on the post-movement traffic lane 52, after movement of the vehicle 10 between lanes by automatic control has been completed. If the distance L1 is less than the first reference distance, then the driver may not be able to acknowledge the control transfer request within ample time when a control transfer request has been made after movement in the traffic lane.

When the vehicle 10 has moved from the traffic lane 51 to the traffic lane 52, the vehicle 10 may enter into the control transfer request zone TD1 immediately after having moved. The vehicle control system 1 notifies the driver of the control transfer request when the vehicle 10 enters into the control transfer request zone TD1. When the driver is notified of the control transfer request, they must be aware of the conditions around the vehicle and begin operation of the vehicle 10 by manual control. Therefore, when notification of a control transfer request is given immediately after the vehicle 10 has moved between lanes, the driver may feel rushed by the automatic control operation.

Therefore, when the distance L1 between the location P2 of the vehicle 10 on the post-movement traffic lane 52 and the control transfer request zone TD1 is less than the first reference distance, the vehicle control system 1 cancels the lane change plan for movement from the traffic lane 51 to the traffic lane 52, and continues traveling on the traffic lane 51. Since the vehicle control system 1 thus prevents the driver from being notified by the control transfer request immediately after the vehicle 10 has moved between lanes, the driver can feel more comfortable with operation of the vehicle 10 by automatic control.

Figure 2:
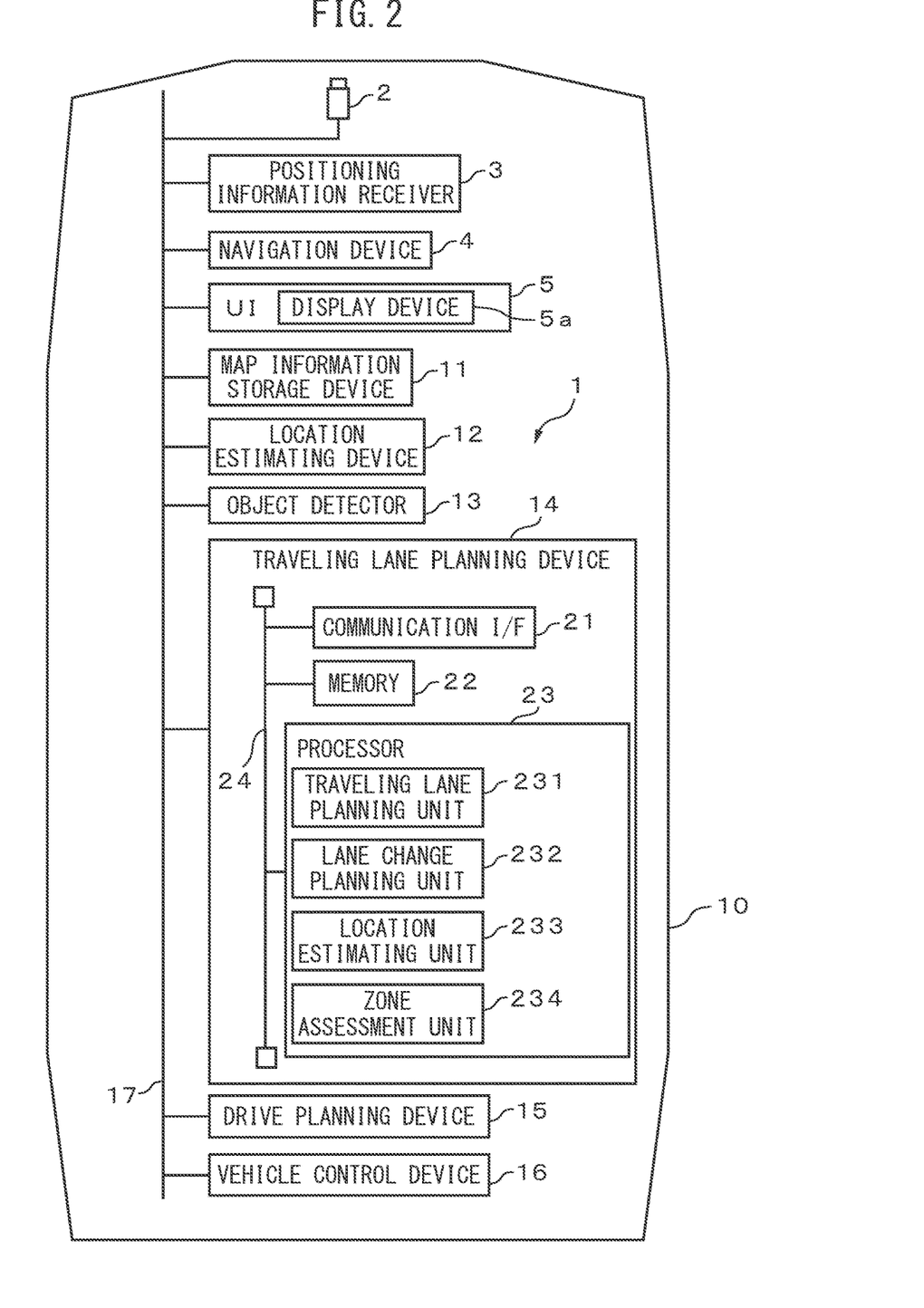
FIG. 2 is a general schematic drawing of a vehicle in which the vehicle control system of the first embodiment is mounted.

FIG. 2 is a general schematic drawing of a vehicle 10 in which the vehicle control system 1 is mounted. The vehicle 10 has a camera 2, a positioning information receiver 3, a navigation device 4, a user interface (UI) 5, a map information storage device 11, a location estimating device 12, an object detector 13, a traveling lane planning device 14, a drive planning device 15 and a vehicle control device 16. The vehicle 10 may also have a LiDAR sensor, as a distance sensor (not shown) for measurement of the distance of the vehicle 10 to surrounding objects.

The camera 2, positioning information receiver 3, navigation device 4, UI 5, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 17 to the location estimating device 12 and object detector 13 etc. The camera image is also used for processing at the location estimating device 12 to estimate the location of the vehicle 10. At the object detector 13, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11 etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route R from the current location to the destination location of the vehicle 10. The navigation route R includes information relating to the locations of right turns, left turns, merging and branching. When the destination location has been newly set or the current location of the vehicle 10 has exited the navigation route R, the navigation device 4 creates a new navigation route R for the vehicle 10. Every time a navigation route R is created, the navigation device 4 outputs the navigation route R to the location estimating device 12 and the traveling lane planning device 14 etc., via the in-vehicle network 17.

The UI 5 is an example of the notifying unit. The UI 5, controlled by the navigation device 4 and vehicle control device 16 etc., notifies the driver of the vehicle 10 traveling information, the control transfer request or the request for lane change by manual control. The UI 5 also creates an operation signal in response to operation of the vehicle 10 by the driver. The traveling information of the vehicle 10 includes information relating to the current location of the vehicle and the current and future route of the vehicle, such as the navigation route. The UI 5 has a display device 5a such as a liquid crystal display or touch panel, for display of the traveling information. The UI 5 may also have an acoustic output device (not shown) to notify the driver of traveling information. The UI 5 also has a touch panel or operating button, for example, as an input device for inputting operation information from the driver to the vehicle 10. The operation information may be, for example, a destination location, transit points, vehicle speed control transfer request acknowledgement, or control information for other vehicles 10. The UI 5 outputs the input operation information to the navigation device 4 and the vehicle control device 16 etc., via the in-vehicle network 17.

The map information storage device 11 stores wide-area map information for a relatively wide area (an area of 10 to 30 $km^2$, for example) that includes the current location of the vehicle 10. The map information preferably has high precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 3, the map information storage device 11 refers to the stored wide-area map information and outputs map information for a relatively narrow area including the current location represented by the positioning information (for example, an area of 100 $m^2$ to 10 $km^2$), through the in-vehicle network 17 to the location estimating device 12, object detector 13, traveling lane planning device 14, drive planning device 15 and vehicle control device 16 etc.

The location estimating device 12 estimates the location of the vehicle 10 at the camera image photograph time, based on the road features surrounding the vehicle 10 represented in the camera image. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16 etc.

The object detector 13 detects other objects around the vehicle 10 and their types (for example, vehicles) based on the camera image, for example. Other objects also include other vehicles traveling around the vehicle 10. The object detector 13 tracks other detected objects and determines the trajectories of the other objects. In addition, the object detector 13 identifies the traveling lanes in which the other objects are traveling, based on the lane marking lines represented in the map information and the locations of the objects. The object detector 13 outputs object detection information which includes information representing the types of other objects that were detected, information indicating their locations, and also information indicating their traveling lanes, to the traveling lane planning device 14 and drive planning device 15 etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route R, based on the map information, the navigation route R and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the traveling lane plan to the drive planning device 15. The traveling lane planning device 14 is an example of the vehicle control device.

The traveling lane planning device 14 also determines whether or not a lane change is necessary within the nearest driving zone selected from the navigation route R, based on the traveling lane plan, the map information, the navigation route R and the current location of the vehicle 10, and generates a lane change plan in accordance with the assessment results. Specifically, the traveling lane planning device 14 determines whether or not a lane change is necessary for moving to a traffic lane toward the destination location of the vehicle 10, based on the navigation route R and the current location of the vehicle 10. It is determined whether or not the vehicle 10 is approaching another road that merges ahead from the traveling route on which it is currently traveling (merge), or the vehicle 10 is exiting onto another road branching out ahead from the traveling route (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. When a lane change plan has been generated, the traveling lane planning device 14 outputs the traveling lane plan with the added lane change plan to the drive planning device 15.

When a lane change plan has been generated, the traveling lane planning device 14 also determines whether or not a control transfer request zone exists in which the driver is to be requested to transfer operation of the vehicle 10 from automatic control to manual control, at less than the first reference distance from the location of the vehicle 10 on the post-movement traffic lane. The traveling lane planning device 14 also cancels movement of the vehicle 10 between lanes when a control transfer request zone exists. The traveling lane planning device 14 further estimates the location of the vehicle 10 on the post-movement traffic lane. The traveling lane planning device 14 comprises a communication interface, (IF) 21, a memory 22 and a processor 23 for this purpose. The communication interface 21, memory 22 and processor 23 are connected via signal wires 24. The communication interface 21 has an interface circuit to connect the traveling lane planning device 14 with the in-vehicle network 17.

All or some of the functions of the traveling lane planning device 14 are functional modules driven by a computer program operating on the processor 23, for example. The processor 23 has a traveling lane planning unit 231, a lane change planning unit 232, a location estimating unit 233 and a zone assessment unit 234. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device. The traveling lane planning unit 231 generates the aforementioned traveling lane plan while the lane change planning unit 232 generates the aforementioned lane change plan. Other details regarding operation of the traveling lane planning device 14 are described below.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 15 generates a driving plan for stopping the vehicle 10. The drive planning device 15 outputs the driving plan to the vehicle control device 16 for each driving plan generated.

When the vehicle 10 is operated by automatic control, the vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also determines the amount of fuel injection according to a set accelerator level, and outputs a control signal corresponding to the amount of fuel injection to a drive unit (not shown) of the engine of the vehicle 10, via the in-vehicle network 17.

Alternatively, the vehicle control device 16 may output a control signal corresponding to a set brake level to the brake (not shown) of the vehicle 10, via the in-vehicle network 17. When the vehicle 10 is operated by manual control, the vehicle control device 16 controls the steering wheel, drive unit or brake according to the amount of driver-operated steering, accelerator or brake level.

For FIG. 2, the map information storage device 11, location estimating device 12, object detector 13, traveling lane planning device 14, drive planning device 15 and vehicle control device 16 were explained as separate devices, but all or some of them may be constructed in a single device.

Figure 3:
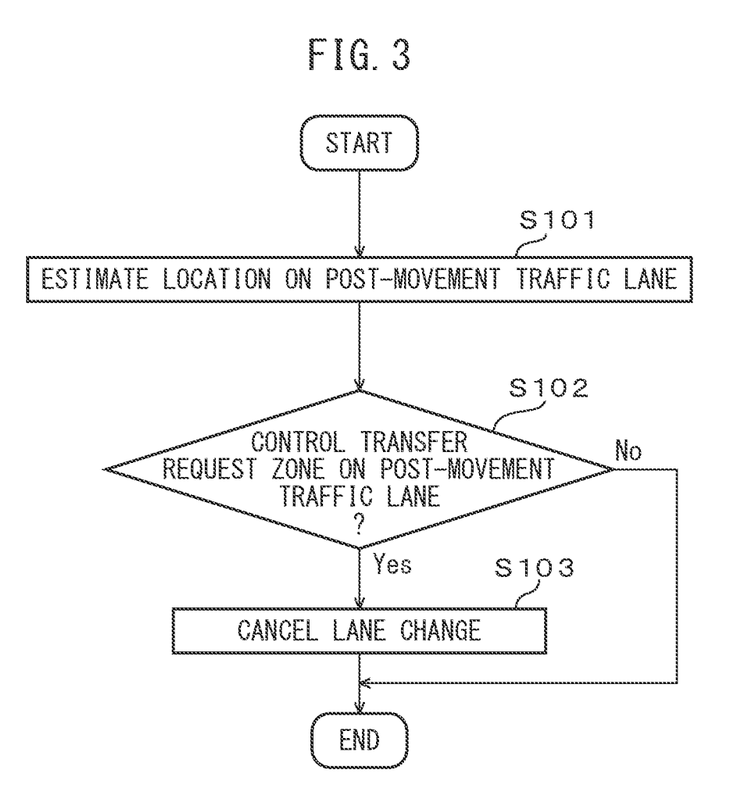
FIG. 3 is an example of an operation flow chart for vehicle control processing by the vehicle control system of the first embodiment.

FIG. 3 is an example of an operation flow chart for vehicle control processing by the vehicle control system 1 of the first embodiment. Vehicle control processing by the vehicle control system 1 will be described below with reference to FIG. 3. The traveling lane planning device 14 carries out vehicle control processing according to the operation flow chart shown in FIG. 3, each time a new lane change plan is generated.

First, upon generation of the new lane change plan, the location estimating unit 233 estimates the location of the vehicle 10 on the post-movement traffic lane that will result when the vehicle 10 has moved between lanes based on the lane change plan (step S101).

The zone assessment unit 234 then determines whether or not a control transfer request zone exists at less than the first reference distance from the location of the vehicle 10 on the post-movement traffic lane (step S102).

When a control transfer request zone exists (step S102—Yes), the lane change planning unit 232 cancels the generated lane change plan (step S106), thus completing the series of processing steps. The lane change planning unit 232 cancels generation of the same lane change plan until the vehicle 10 passes through the control transfer request zone.

When no control transfer request zone exists (step S105—No), the series of processing steps is complete.

An operating example of the vehicle control system 1 will now be further explained with reference to FIG. 4.

Figure 4:
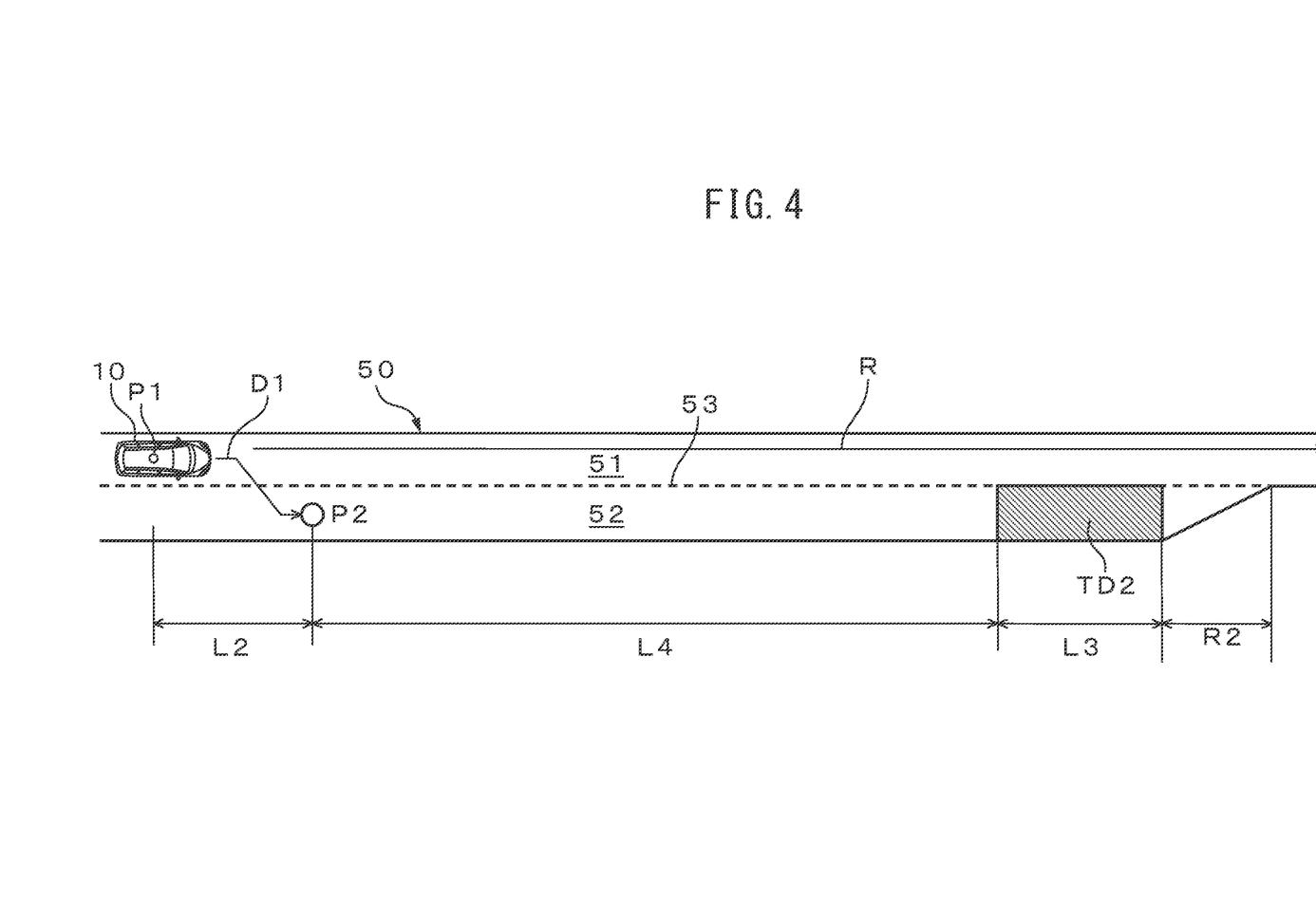
FIG. 4 is a diagram illustrating an example of vehicle control processing when a control transfer request zone exists in a post-movement traffic lane.

FIG. 4 is a diagram illustrating an example of vehicle control processing when a control transfer request zone exists in a post-movement traffic lane. The lane change planning unit 232 generates a lane change plan D1 for moving from the traveling traffic lane 51 to an adjacent traffic lane 52, based on the request for movement between lanes by the driver, for example.

The location estimating unit 233 estimates a location P2 of the vehicle 10 on the post-movement traffic lane 52. The location estimating unit 233 calculates a distance L2 as the product of the most recent average speed of the vehicle 10 and a predetermined time, and estimates the location P2 on the traffic lane 52 from the current location P1 of the vehicle 10 by distance L2 in the traveling direction, as the location of the vehicle 10 on the post-movement traffic lane 52. The predetermined time may be, for example, the maximum time or average time estimated to be required for a lane change by automatic control, or it may be the time generally required for a lane change by manual control by the driver.

The location estimating unit 233 may also estimate the location P2 on the traffic lane 52 from the current location P1 of the vehicle 10 by a predetermined distance in the traveling direction, as the location of the vehicle 10 on the post-movement traffic lane 52. The predetermined distance may be, for example, the maximum distance estimated to be required for a lane change, or it may be the distance generally required for a lane change by manual control by the driver.

The location estimating unit 233 also calculates a distance L2 as the product of the most recent average speed of the vehicle 10, and the moving time which is the quotient of the distance between the center line of the traveling traffic lane 51 and the center line of the post-movement traffic lane 52, divided by the lateral traveling speed. The location estimating unit 233 may also estimate the location P2 on the traffic lane 52 from the current location P1 of the vehicle 10 by the distance L2 in the traveling direction, as the location of the vehicle 10 on the post-movement traffic lane 52. The lateral traveling speed is determined, for example, based on the most recent average speed of the vehicle 10 and the steering angle, the latter being the steering angle for movement from the traffic lane 51 to the traffic lane 52 from the current location P1 of the vehicle 10.

The traveling lane planning unit 231 refers to the map information and determines that there is an automatic control prohibited region R2 and control transfer request zone TD2 on the traffic lane 52 in the nearest driving zone selected from the navigation route R. In the example shown in FIG. 4, the traffic lane 52 disappears ahead starting from the automatic control prohibited region R2. The automatic control prohibited region is therefore set before the point where the traffic lane or road disappears. The control transfer request zone TD2 is located before the automatic control prohibited region R2. The automatic control prohibited region and control transfer request zone are registered in the map information. When only the automatic control prohibited region is registered in the map information and the control transfer request zone is not registered, the traveling lane planning device 14 may set the control transfer request zone before the automatic control prohibited region based on the automatic control prohibited region registered in the map information.

The automatic control prohibited region R2 may also be a region with terrain that does not allow safe vehicle operation control by the vehicle control system 1, a region not represented in the high precision map, or a region temporarily prohibited from vehicle travel by automatic control. A region with terrain that does not allow safe vehicle operation by the vehicle control system 1 may be terrain with a curve having a large curvature radius, terrain with a large slope, terrain that includes road markings such as stop lines, terrain that includes an intersection, terrain that includes a bus stop, terrain where the road on which the vehicle is traveling merges with other road and the merge zone for merging with the other road is short, terrain where the road is too narrow to allow safe control of vehicle operation by the vehicle control system 1, or terrain wide enough to allow parallel travel of multiple vehicles but without lane marking lines. A region not represented in the high precision map may be a region ahead of a toll gate on an automotive road, or a service area or parking area. A region temporarily prohibited from vehicle travel by automatic control may be a construction zone or a region flagged with a falling object warning.

The control transfer request zone TD2 is set on the traffic lane 52 as a zone from the start location of the automatic control prohibited region R2 to a location before it by a distance L3. The distance L3 is a distance that allows manual control of the vehicle 10 to be initiated by acknowledgement of a control transfer request with ample time by a driver notified of the control transfer request.

The zone assessment unit 234 calculates a distance L4 along a traffic lane 52 between the location P2 of the vehicle 10 on the post-movement traffic lane and the start location of the control transfer request zone TD2, based on the map information, and determines that the distance L4 is less than the first reference distance. The first reference distance is a distance such that any distance greater than the distance allows the driver to have ample time to acknowledge the control transfer request and begin manual control of the vehicle 10 even if the driver is notified of the control transfer request on the post-movement traffic lane 52, after movement of the vehicle 10 between lanes by automatic control has been completed.

Since a control transfer request zone exists at less than the first reference distance from the location P2 of the vehicle 10 on the post-movement traffic lane, the lane change planning unit 232 cancels the lane change plan D1 for moving from the traffic lane 51 to the traffic lane 52. The lane change planning unit 232 cancels generation of the lane change plan for new movement from the traffic lane 51 to the adjacent traffic lane 52, until the vehicle 10 passes through the control transfer request zone TD2.

Since the vehicle control device prevents the driver from being notified by the control transfer request immediately after the vehicle has moved between lanes, as explained above, excessive notification of the driver of control transfer requests is prevented and the driver can therefore feel more comfortable with operation of the vehicle by automatic control.

Another embodiment of the vehicle control system will now be described with reference to FIG. 5 to FIG. 9. The explanation of the first embodiment is to be applied for any aspects of this additional embodiment that are not explained here.

When a lane change plan has been generated in the vehicle control system 1 of the second embodiment, the zone assessment unit 234 of the processor 23 of the traveling lane planning device 14 determines whether or not a lane change schedule zone exists in which movement is planned from the post-movement traffic lane back to the pre-movement traffic lane, at less than a second reference distance from the location of the vehicle 10 on the post-movement traffic lane. When a lane change schedule zone exists, the lane change planning unit 232 also cancels movement between lanes by the vehicle 10.

The traveling lane planning unit 231 of the processor 23 of the traveling lane planning device 14 also generates, based on the location of the vehicle 10 on the post-movement traffic lane, the map information and the navigation route R, a traveling lane plan after traffic lane movement in the nearest driving zone on the navigation route R. The lane change planning unit 232 generates a lane change plan after traffic lane movement, representing movement of the vehicle 10 between lanes, based on the traveling lane plan after traffic lane movement.

Figure 5:
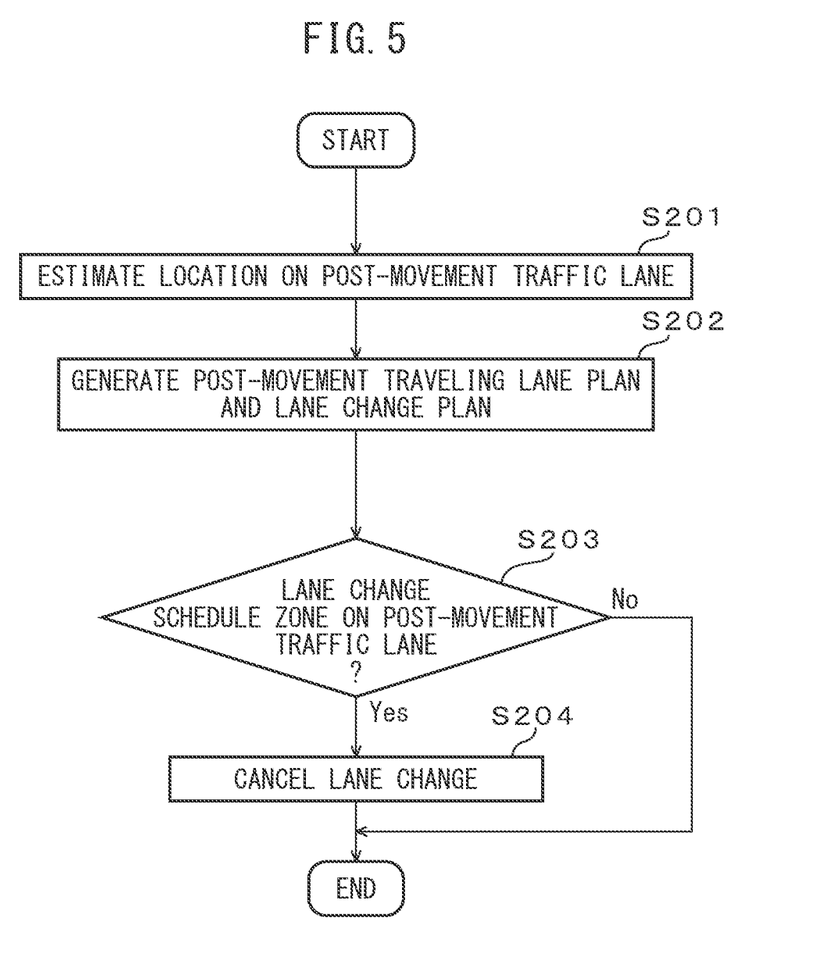
FIG. 5 is an example of an operation flow chart for vehicle control processing by a vehicle control system according to a second embodiment.

FIG. 5 is an example of an operation flow chart for vehicle control processing by the vehicle control system 1 according to the second embodiment. Operation in step S201 and step S204 of this embodiment is the same as step S101 and step S103 in the first embodiment described above.

In step S202, the traveling lane planning unit 231 generates a traveling lane plan for after the traffic lane movement, based on the location of the vehicle 10 after traffic lane movement, the map information, the navigation route R and the surrounding environment information, within the nearest driving zone selected from the navigation route R. The lane change planning unit 232 determines whether or not a lane change is necessary within the nearest driving zone selected from the navigation route R, based on the location of the vehicle 10 after traffic lane movement, the traveling lane plan after traffic lane movement, the map information and the navigation route R, and generates a lane change plan in accordance with the determined results.

Next, the zone assessment unit 234 determines whether or not a lane change schedule zone exists in which movement is planned from the post-movement traffic lane back to the pre-movement traffic lane, at less than a second reference distance from the location of the vehicle 10 on the post-movement traffic lane (step S203).

When a lane change schedule zone exists (step S203—Yes), the lane change planning unit 232 cancels the generated lane change plan (step S204). The lane change planning unit 232 cancels generation of the same lane change plan until the vehicle 10 passes through the lane change schedule zone.

When no lane change schedule zone exists (step S203—No), the series of processing steps is complete.

An operating example of the vehicle control system 1 will now be further explained with reference to FIGS. 6 to 8.

Figure 6:
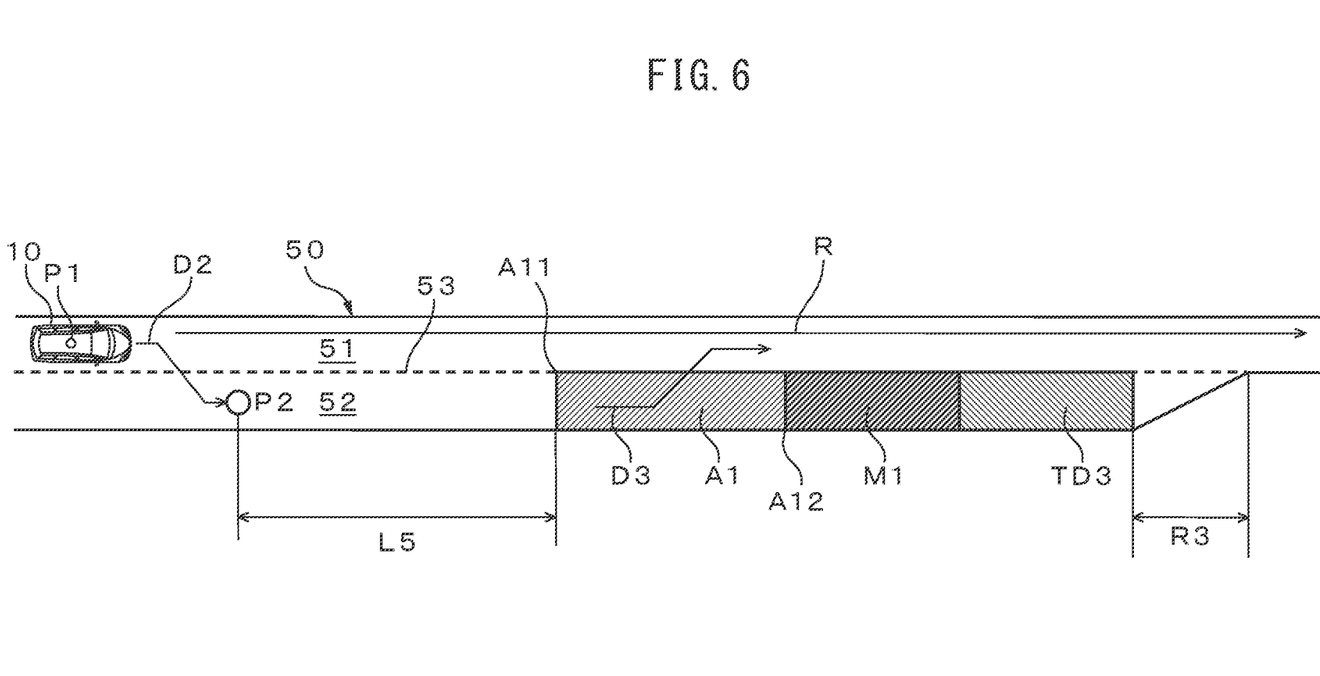
FIG. 6 is a diagram illustrating an example of vehicle control processing when a lane change schedule zone exists in a post-movement traffic lane.

FIG. 6 is a diagram illustrating an example of vehicle control processing when a lane change schedule zone exists in a post-movement traffic lane. The lane change planning unit 232 generates a lane change plan D2 for moving from the traveling traffic lane 51 to a traffic lane 52, based on the request for movement between lanes by the driver, for example.

The location estimating unit 233 estimates a location P2 of the vehicle 10 on the post-movement traffic lane 52. The traveling lane planning unit 231 refers to the map information and determines that there is an automatic control prohibited region R3 and control transfer request zone TD3 on the traffic lane 52 in the nearest driving zone selected from the navigation route R.

Since the control transfer request zone TD3 is set on the traffic lane 52 in the nearest driving zone selected from the navigation route R, the traveling lane planning unit 231 generates a traveling lane plan after traffic lane movement that includes traveling of the vehicle 10 on the traffic lane 51 until the vehicle 10 reaches the control transfer request zone TD3.

The lane change planning unit 232 generates a post-movement traffic lane change plan D3, returning from the post-movement traffic lane 52 to the pre-movement traffic lane 51, based on the traveling lane plan after traffic lane movement, the location P2 of the vehicle 10 on the post-movement traffic lane 52, the map information and the navigation route R.

As the post-movement traffic lane change plan D3, the lane change planning unit 232 sets on the traffic lane 52 an automatic lane change schedule zone A1 in which movement of the vehicle 10 between lanes by automatic control is planned, and a manual lane change schedule zone M1 in which movement of the vehicle 10 between lanes by manual control is planned.

In the automatic lane change schedule zone A1, the vehicle control system 1 operates the vehicle 10 by automatic control, attempting to move from the traffic lane 52 to the traffic lane 51 of the road 50. In the automatic lane change schedule zone A1, the effects of other vehicles may prevent the vehicle control system 1 from being able to operate the vehicle 10 by automatic control and move it from the traffic lane 52 to the traffic lane 51 of the road 50. For this reason the manual lane change schedule zone M1 is set on the traveling direction side of the automatic lane change schedule zone A1.

In the manual lane change schedule zone M1, the vehicle control device 16 of the vehicle control system 1 notifies the driver of a request to move from the traffic lane 52 to the traffic lane 51 by manual control, via the UI 5. Operation of the vehicle 10 is in an automatic control state, and the vehicle control device 16 controls the steering wheel, drive unit or brake according to the amount of driver-operated steering, accelerator or brake level. In the manual lane change schedule zone M1, the driver operates the vehicle 10 by manual control to allow movement from the traffic lane 52 to the traffic lane 51 of the road 50.

The lane change planning unit 232 sets the length of the automatic lane change schedule zone A1 based on, for example, the most recent average speed of the vehicle 10. The lane change planning unit 232 also sets the end location A12 of the automatic lane change schedule zone A1 to be a location on the traffic lane 52 at a predetermined distance before the start location of the control transfer request zone TD3. The lane change planning unit 232 also sets the start location A11 of the automatic lane change schedule zone A1 to be a location on the traffic lane 52 before the end location A12 by the length of the automatic lane change schedule zone A1. The lane change planning unit 232 further sets the manual lane change schedule zone M1 between the end location A12 of the automatic lane change schedule zone A1 and the start location of the control transfer request zone TD3.

The zone assessment unit 234 calculates a distance L5 along a traffic lane 52 between the location P2 of the vehicle 10 on the post-movement traffic lane and the start location A11 of the automatic lane change schedule zone A1, based on the map information, and determines that the distance L5 is less than the second reference distance. The second reference distance is a distance such that any distance greater than the distance will not cause the driver to feel rushed by driving of automatic control even when movement of the vehicle 10 between lanes by automatic control from the post-movement traffic lane 52 to the pre-movement traffic lane 51 is again carried out after completion of movement of the vehicle 10 between lanes by automatic control. If the distance L5 is less than the second reference distance, then the driver may not feel comfortable with driving by automatic control during movement of the vehicle 10 between lanes by automatic control from the post-movement traffic lane 52 to the pre-movement traffic lane 51.

Since the automatic lane change schedule zone A1 is less than the second reference distance from the location P2 of the vehicle 10 on the post-movement traffic lane, the lane change planning unit 232 cancels the lane change plan D2 for moving from the traffic lane 51 to the traffic lane 52. The lane change planning unit 232 cancels generation of the lane change plan for new movement from the traffic lane 51 to the traffic lane 52, until the vehicle 10 passes through the lane change schedule zones A1, M1.

Figure 7:
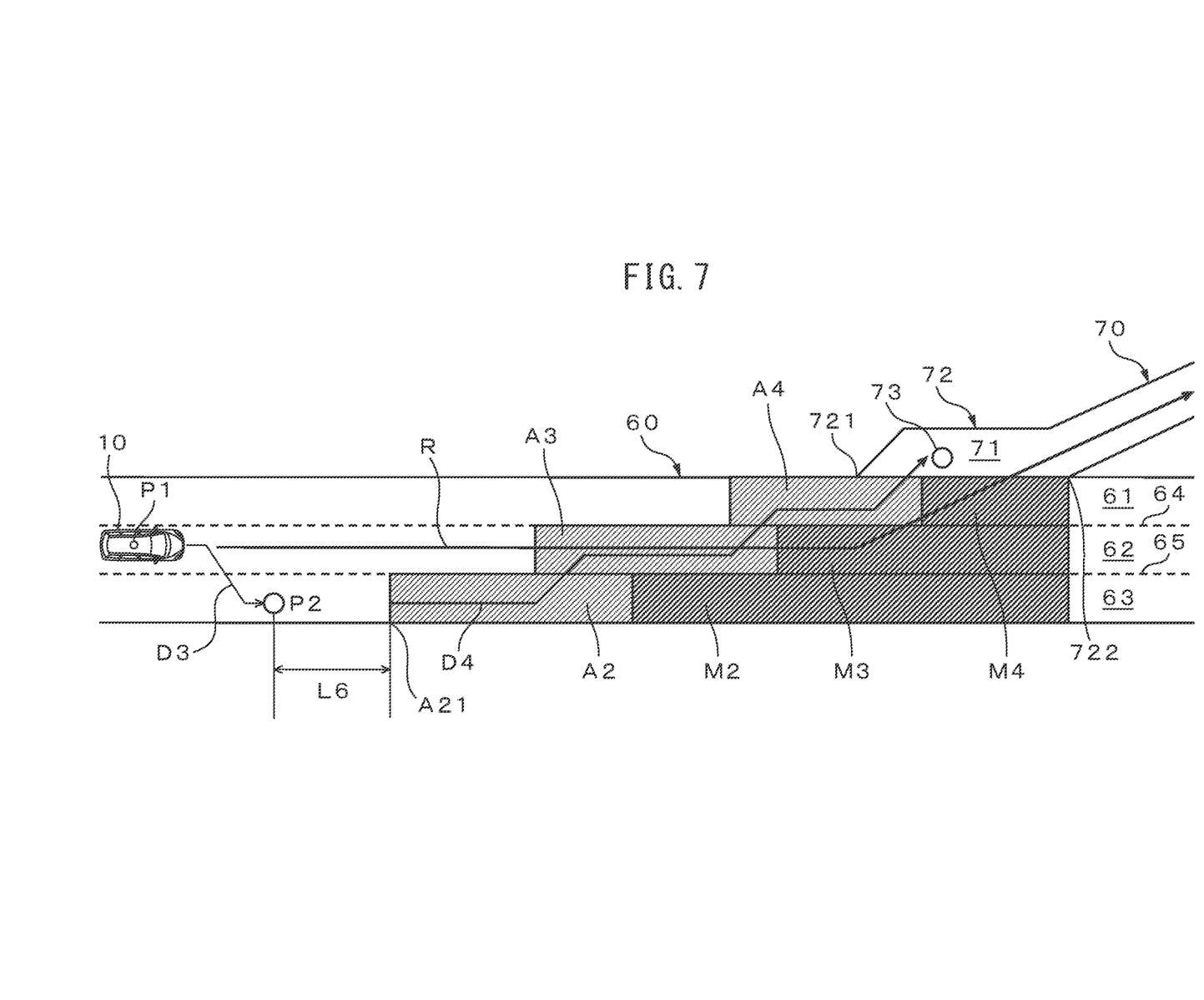
FIG. 7 is a diagram illustrating another example of vehicle control processing when a lane change schedule zone exists in a post-movement traffic lane.

FIG. 7 is a diagram illustrating another example of vehicle control processing when a lane change schedule zone exists in a post-movement traffic lane. In the nearest driving zone selected from the navigation route R, the vehicle 10 is traveling on the road 60 at the current location P1 and is expected to exit to a branching road 70 at a branching location 72. The road 60 on which the vehicle 10 is traveling has three traffic lanes 61, 62, 63, the traffic lane 61 and traffic lane 62 being divided by a lane marking line 64 and the traffic lane 62 and traffic lane 63 being divided by a lane marking line 65. The traffic lane 61 is connected with a traffic lane 71 on the branching road 70 between a branching start location 721 and a branching end location 722, at the branching location 72. The vehicle 10 travels on the traffic lane 62 at the current location P1.

The lane change planning unit 232 generates a lane change plan D3 for movement from the traffic lane 62 to the traffic lane 63 in order to avoid approaching other vehicle (not shown) located ahead, for example.

The location estimating unit 233 estimates a location P2 of the vehicle 10 on the post-movement traffic lane 63. Since there is no automatic control prohibited region in the nearest driving zone selected from the navigation route R, the control transfer request zone is not set.

The traveling lane planning unit 231 generates a traveling lane plan for after the traffic lane movement of traveling on the traffic lane 62, traffic lane 61 and traffic lane 71 in that order, after having traveled on the post-movement traffic lane 63, in the nearest driving zone selected from the navigation route R.

The lane change planning unit 232 generates a post-movement traffic lane change plan D4, for moving from the post-movement traffic lane 63 to the traffic lane 71 of the branching road 70, based on the traveling lane plan after the traffic lane movement, the location P2 of the vehicle 10 on the post-movement traffic lane 63, the map information and the navigation route R.

The lane change planning unit 232 first sets a lane change completion target location 73 on the traffic lane 71 of the branching road 70. As the post-movement traffic lane change plan D4, the lane change planning unit 232 also sets an automatic lane change schedule zone A2 and a manual lane change schedule zone M2 on the traffic lane 63, sets an automatic lane change schedule zone A3 and manual lane change schedule zone M3 on the traffic lane 62, and sets an automatic lane change schedule zone A4 and manual lane change schedule zone M4 on the traffic lane 61.

For example, the lane change planning unit 232 sets the distance between the location P2 of the vehicle 10 on the post-movement traffic lane 63 and the lane change completion target location 73, and the lengths of the automatic lane change schedule zones A2 to A4, based on the most recent average speed of the vehicle 10.

The lane change planning unit 232 also sets a location in the automatic lane change schedule zone A4 on the traffic lane 61 to allow movement of the vehicle 10 to the lane change completion target location 73. The lane change planning unit 232 also sets a location in the automatic lane change schedule zone A3 on the traffic lane 62 to allow movement of the vehicle 10 from the automatic lane change schedule zone A3 to the automatic lane change schedule zone A4. The lane change planning unit 232 also sets a location in the automatic lane change schedule zone A2 on the traffic lane 63 to allow movement of the vehicle 10 from the automatic lane change schedule zone A2 to the automatic lane change schedule zone A3.

The lane change planning unit 232 also sets a zone on the traffic lane 63 from the end location of the automatic lane change schedule zone A2 to the branching end location 722, as the manual lane change schedule zone M2. The lane change planning unit 232 also sets a zone on the traffic lane 63 from the end location of the automatic lane change schedule zone A3 to the branching end location 722, as the manual lane change schedule zone M3. The lane change planning unit 232 also sets a zone on the traffic lane 63 from the end location of the automatic lane change schedule zone A4 to the branching end location 722, as the manual lane change schedule zone M4.

The zone assessment unit 234 calculates a distance L6 along the traffic lane 63 between the location P2 of the vehicle 10 on the post-movement traffic lane and the start location A21 of the automatic lane change schedule zone A2, based on the map information, and determines that the distance L6 is less than the second reference distance.

Since the automatic lane change schedule zone A2 is less than the second reference distance from the location P2 of the vehicle 10 on the post-movement traffic lane, the lane change planning unit 232 cancels the lane change plan D3 for moving from the traffic lane 62 to the traffic lane 63. The lane change planning unit 232 cancels generation of the lane change plan for new movement from the traffic lane 62 to the traffic lane 63, until the vehicle 10 passes through the lane change schedule zones A2 to A4 and M2 to M4. For example, the vehicle control system 1 reduces the speed of the vehicle 10 to maintain a safe distance with other vehicles located ahead.

Figure 8:
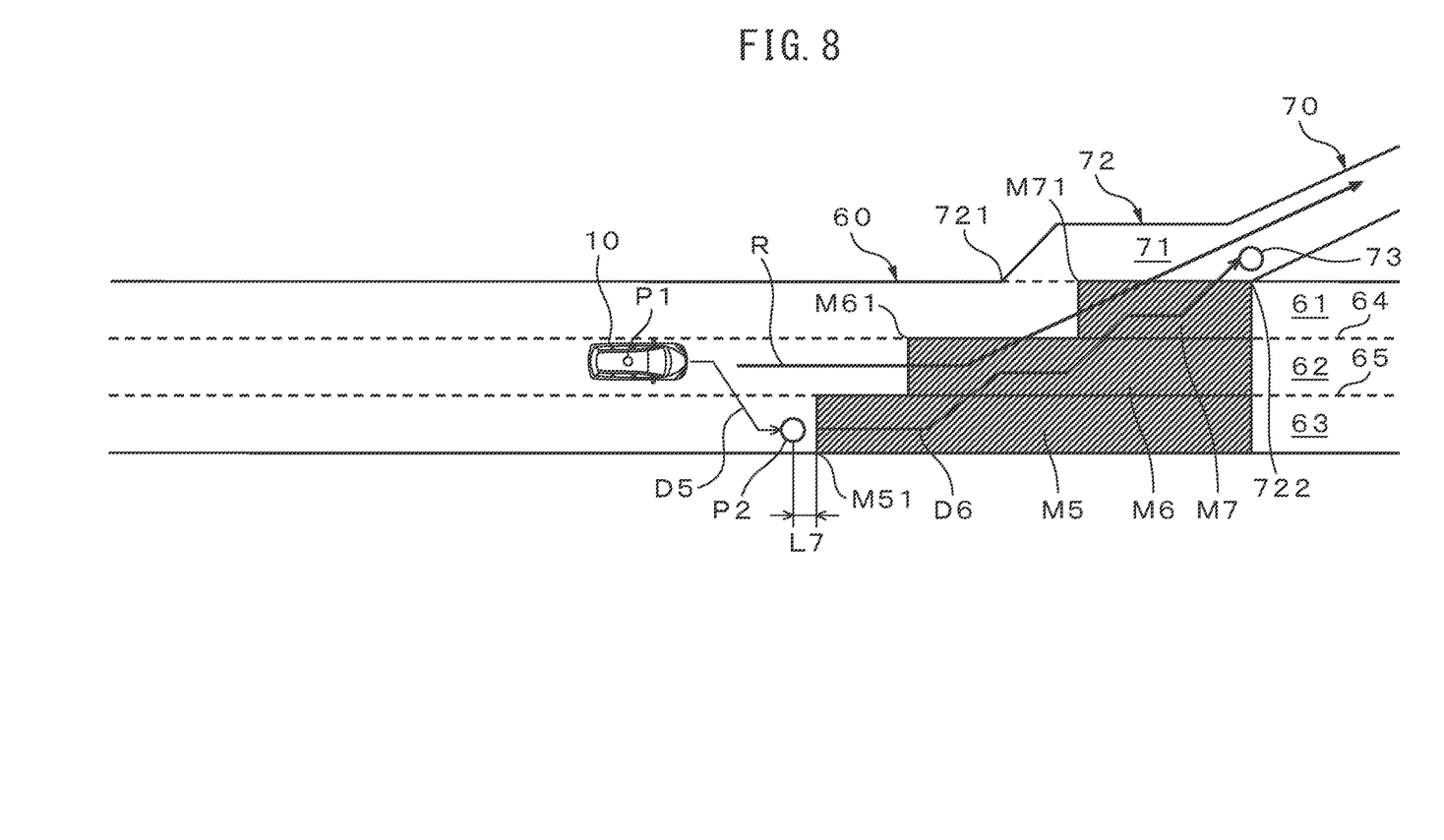
FIG. 8 is a diagram illustrating yet another example of vehicle control processing when a lane change schedule zone exists in a post-movement traffic lane.

FIG. 8 is a diagram illustrating yet another example of vehicle control processing when a lane change schedule zone exists in a post-movement traffic lane. The terrain in the example shown in FIG. 8 is the same as FIG. 7, but the current location P1 of the vehicle 10 approaches closer to the branching location 72 than the location shown in FIG. 7.

The lane change planning unit 232 generates a post-movement traffic lane change plan D5, for moving from the post-movement traffic lane 63 to the traffic lane 71 of the branching road 70, based on the traveling lane plan after traffic lane movement, the location P2 of the vehicle 10 on the post-movement traffic lane 63, the map information and the navigation route R.

The lane change planning unit 232 first sets a lane change completion target location 73 on the traffic lane 71 of the branching road 70. As the post-movement traffic lane change plan D5, the lane change planning unit 232 also sets a manual lane change schedule zone M5 on the traffic lane 63, sets a manual lane change schedule zone M6 on the traffic lane 62, and sets a manual lane change schedule zone M7 on the traffic lane 63. Since the distance between the location P2 of the vehicle 10 on the post-movement traffic lane 63 and the branching start location 721 is shorter than the predetermined distance, the automatic lane change schedule zone is not set.

The lane change planning unit 232 may set the start locations in the manual lane change schedule zones M5 to M7 based on the distance between the location P2 of the vehicle 10 on the post-movement traffic lane 52 and the lane change completion target location 73, and the most recent average speed of the vehicle 10, for example.

The lane change planning unit 232 also sets a start location M71 in the manual lane change schedule zone M7 on the traffic lane 61, to allow movement of the vehicle 10 to the lane change completion target location 73. The lane change planning unit 232 also sets a start location M61 in the manual lane change schedule zone M6 on the traffic lane 62, to allow movement of the vehicle 10 from the manual lane change schedule zone M6 to the manual lane change schedule zone M7. The lane change planning unit 232 also sets a start location M51 in the manual lane change schedule zone M5 on the traffic lane 63, to allow movement of the vehicle 10 from the manual lane change schedule zone M5 to the manual lane change schedule zone M6.

The lane change planning unit 232 also sets end locations in manual lane change schedule zones M5 to M7, aligned on each traffic lane matching the branching end location 722.

The zone assessment unit 234 calculates a distance L7 along the traffic lane 63 between the location P2 of the vehicle 10 on the post-movement traffic lane and the start location M51 of the manual lane change schedule zone M5, based on the map information, and determines that the distance L7 is less than the second reference distance.

Since the manual lane change schedule zone M5 is less than the second reference distance from the location P2 of the vehicle 10 on the post-movement traffic lane, the lane change planning unit 232 cancels the lane change plan D5 for moving from the traffic lane 62 to the traffic lane 63. The lane change planning unit 232 cancels generation of the lane change plan for new movement from the traffic lane 62 to the traffic lane 63, until the vehicle 10 passes through the lane change schedule zones M5 to M7.

Since the vehicle control device prevents the additional movement back to the pre-movement traffic lane immediately after the vehicle has moved between lanes, as explained above, excessive notification of the driver of control transfer requests is prevented and the driver can therefore feel more comfortable with operation of the vehicle by automatic control.

Figure 9:
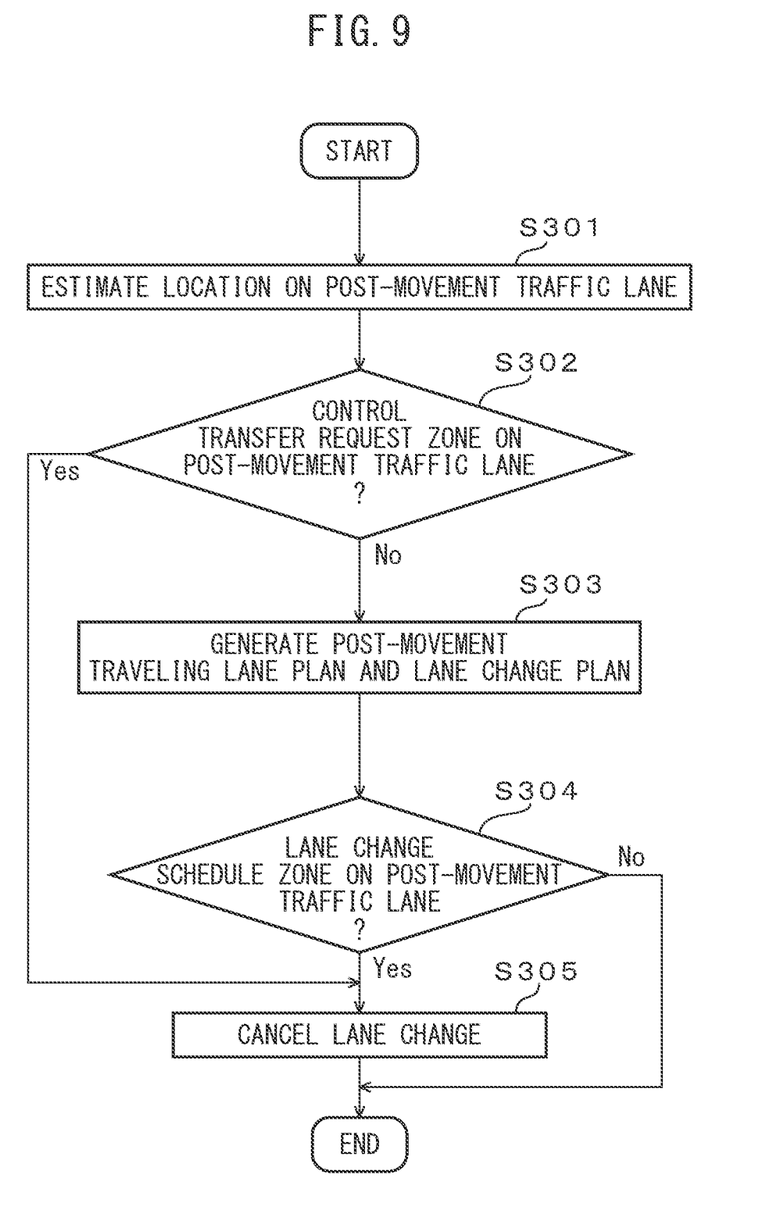
FIG. 9 is an example of an operation flow chart for vehicle control processing by the vehicle control system according to a third embodiment.

FIG. 9 is an example of an operation flow chart for vehicle control processing by the vehicle control system of the third embodiment.

In the vehicle control system 1 of the third embodiment, the lane change plan 14 determines whether or not a control transfer request zone exists at less than the first reference distance from the location of the vehicle 10 on the post-movement traffic lane. When no control transfer request zone exists, the lane change plan 14 determines whether or not a lane change schedule zone exists in which movement is planned from the post-movement traffic lane back to the pre-movement traffic lane, at less than the second reference distance from the location of the vehicle 10 on the post-movement traffic lane.

Operation in step S301, step S302 and step S305 of this embodiment is the same as in step S101 to step S103 of the first embodiment described above. Likewise, operation in step S303 and step S304 of this embodiment is the same as in step S202 and step S203 in the second embodiment described above.

Operation according to the first embodiment and second embodiment may be carried out in the vehicle control system of this embodiment as well.

Since the vehicle control device prevents the additional movement back to the pre-movement traffic lane immediately after the vehicle has moved between lanes, as explained above, excessive notification of the driver of control transfer requests is prevented and the driver can therefore feel more comfortable with operation of the vehicle by automatic control.

The vehicle control device, the medium that stores a computer program for vehicle control and the method for controlling a vehicle according to the embodiment described above may incorporate appropriate modifications that are still within the gist of the disclosure. Moreover, the technical scope of the disclosure is not limited to this embodiment, and includes the invention and its equivalents as laid out in the Claims.

The invention claimed is:
1. A vehicle control device comprising:
   a processor that is configured to generate a first traveling lane plan representing a traveling lane in which a vehicle is traveling within a first driving zone of a navigation route, based on a current location of the vehicle, map information and the navigation route, generate a first lane change plan representing movement of the vehicle between lanes, based on the first traveling lane plan, on surrounding environment information, or a request for movement between lanes by the driver, determine whether or not there exists a control transfer request zone where the driver is to be given a request to transfer driving of the vehicle from automatic control to manual control at less than a first reference distance from the location of the vehicle on a post-movement traffic lane, when the first lane change plan has been generated, and control the vehicle to cancel the first lane change plan and refrain from changing lanes when the control transfer request zone exists at less than the first reference distance from the location of the vehicle on a post-movement traffic lane.

2. The vehicle control device according to claim 1, wherein the processor is further configured to estimate a location of the vehicle on the post-movement traffic lane, generate a second traveling lane plan representing the traveling lane in which the vehicle is traveling within a second driving zone of the navigation route, based on the location of the vehicle on the post-movement traffic lane, the map information and the navigation route, and generate a second lane change plan representing movement of the vehicle between lanes based on the second traveling lane plan.

3. The vehicle control device according to claim 2, wherein the processor is further configured to set the lane change schedule zone to be an automatic lane change schedule zone in which movement of the vehicle between lanes by automatic control is planned or a manual lane change schedule zone in which movement of the vehicle between lanes by manual control is planned, based on the second traveling lane plan.

4. The vehicle control device according to claim 1, wherein the processor is further configured to generate the first lane change plan based on the first traveling lane plan, or the surrounding environment information, and determine whether or not the control transfer request zone or lane change schedule zone exists, when the first lane change plan has been generated.

5. A computer-readable, non-transitory medium storing a computer program for vehicle control, wherein the computer program causes a processor to execute a process, the process comprising:

generating a first traveling lane plan representing a traveling lane in which a vehicle is traveling within a first driving zone of a navigation route, based on a current location of the vehicle, map information and the navigation route;

generating a first lane change plan representing movement of the vehicle between lanes, based on the first traveling lane plan or on surrounding environment information;

determining whether or not there exists a control transfer request zone where the driver is to be given a request to transfer driving of the vehicle from automatic control to manual control at less than a first reference distance from the location of the vehicle on a post-movement traffic lane, and controlling the vehicle to cancel the first lane change plan and refrain from changing lanes when the control transfer request zone exists less than the first reference distance from the location of the vehicle on the post-movement traffic lane.

6. A method for controlling a vehicle carried out by a vehicle control device, the method comprising:

generating a first traveling lane plan representing a traveling lane in which a vehicle is traveling within a first driving zone of a navigation route, based on a current location of the vehicle, map information and the navigation route;

generating a first lane change plan representing movement of the vehicle between lanes, based on the first traveling lane plan or on surrounding environment information;

determining whether or not there exists a control transfer request zone where the driver is to be given a request to transfer driving of the vehicle from automatic control to manual control at less than a first reference distance from the location of the vehicle on a post-movement traffic lane, and controlling vehicle to cancel the first lane change plan and refrain from changing lanes when the control transfer request zone exists less than the first reference distance from the location of the vehicle on the post-movement traffic lane.

* * * * *